(12) United States Patent
Xiao et al.

(10) Patent No.: US 9,865,294 B2
(45) Date of Patent: Jan. 9, 2018

(54) SERVO INTEGRATED BPM TEMPLATE

(71) Applicant: Seagate Technology LLC, Cupertino, CA (US)

(72) Inventors: ShuaiGang Xiao, Fremont, CA (US); XiaoMin Yang, Liv, CA (US); David S. Kuo, Palo Alto, CA (US); Kim Yang Lee, Fremont, CA (US); Yautzong Hsu, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/233,277

(22) Filed: Aug. 10, 2016

(65) Prior Publication Data
US 2017/0084300 A1    Mar. 23, 2017

Related U.S. Application Data

(60) Provisional application No. 62/221,963, filed on Sep. 22, 2015.

(51) Int. Cl.
*G11B 5/855* (2006.01)
*G11B 5/596* (2006.01)
*G11B 20/12* (2006.01)

(52) U.S. Cl.
CPC .......... *G11B 5/855* (2013.01); *G11B 20/1217* (2013.01); *G11B 5/59633* (2013.01); *G11B 2020/1281* (2013.01)

(58) Field of Classification Search
None
See application file for complete search history.

(56) References Cited

U.S. PATENT DOCUMENTS

| | | | |
|---|---|---|---|
| 8,673,541 B2 | 3/2014 | Xiao et al. | |
| 9,079,216 B2 | 7/2015 | Xiao et al. | |
| 9,299,609 B2 | 3/2016 | Yang et al. | |
| 2007/0120292 A1* | 5/2007 | Hattori | B29C 59/022 264/293 |
| 2014/0072830 A1* | 3/2014 | Lille | G11B 5/855 428/847 |
| 2014/0099478 A1* | 4/2014 | Yang | B32B 27/06 428/172 |
| 2015/0262606 A1 | 9/2015 | Xiao et al. | |
| 2016/0064027 A1* | 3/2016 | Arora | G11B 5/855 216/22 |

\* cited by examiner

*Primary Examiner* — Shamim Ahmed

(57) ABSTRACT

Provided herein is a method including forming a data zone guiding pattern and forming a servo zone guiding pattern. A servo pattern and a data pattern are simultaneously formed. Directed self-assembly of block copolymers is guided by the data zone guiding pattern and the servo zone guiding pattern.

20 Claims, 4 Drawing Sheets

SERVO INTEGRATED BPM TEMPLATE

CROSS-REFERENCE TO RELATED APPLICATIONS

This application claims the benefit of U.S. Provisional Patent Application Ser. No. 62/221,963 filed Sep. 22, 2015, entitled "FABRICATING SERVO-INTEGRATED BIT-PATTERNED TEMPLATES".

BACKGROUND

Hard disk drive ("HDD") media may include different regions. For example, HDD media include regions for storing data called data zones. In addition, HDD media include servo zones that contain information for using the data zones. For example, servo zones may include information for head positioning, timing, track following information, etc. As such servo zones have corresponding data zones. HDD media may have numerous servo zones and corresponding data zones.

SUMMARY

Provided herein is a method including forming a data zone guiding pattern and forming a servo zone guiding pattern. A servo pattern and a data pattern are simultaneously formed. Directed self-assembly of block copolymers is guided by the data zone guiding pattern and the servo zone guiding pattern. These and other features and advantages will be apparent from a reading of the following detailed description.

DESCRIPTION

Figure 1:
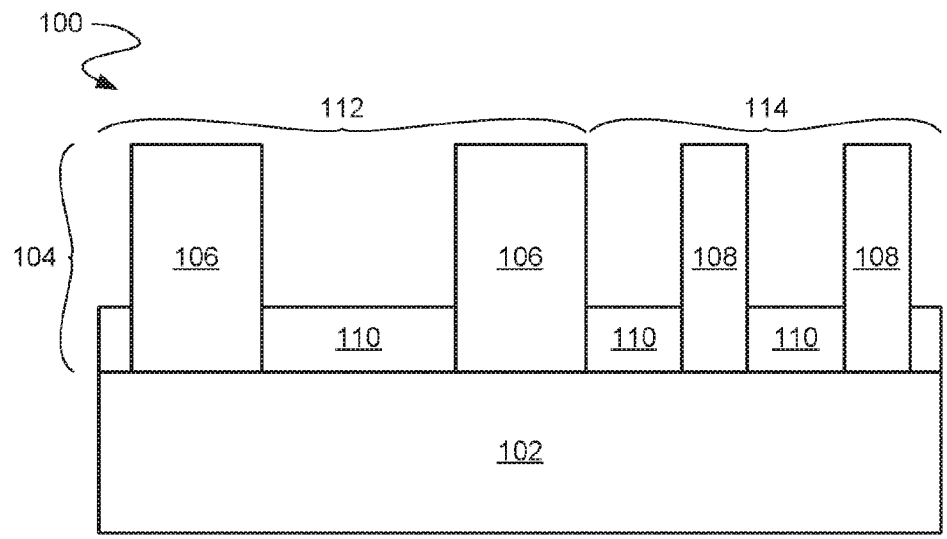
FIG. 1 shows a post imprinting servo and data region resist pattern according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Hard disk drives include magnetic recording media, which may be one or more disks, for example. The disks are typically divided into data zones and servo zones. The data zones include magnetic features for magnetically storing information, which is written-to and read-from the disks. In the case of bit-patterned media ("BPM") the data zone magnetic features may be characterized as magnetic islands or dots that are typically arranged in a regular pattern within the data zones (however various embodiments may include irregular data zone patterns).

The servo zones include features for locating and accessing corresponding data zones. As such, the servo zone features may include information for head positioning, timing, track following information, etc. The servo zone features are typically much larger than the data zone features (however various embodiments may include equal size servo zone features and data zone features, or servo zone features that are smaller than the data zone features). In addition, the servo zone features are typically arranged in an irregular pattern within the servo zones (however various embodiments may include regular servo zone patterns).

In order to create the data zone patterns and servo zone patterns, a template may be used during the manufacturing process. The template is used at certain steps to imprint the disk being manufactured with the desired data zone patterns and servo zone patterns. The template is reusable, and may be used to imprint multiple disks during the manufacturing process. The template is replaced from time to time, however fabrication of replacement templates can be a lengthy process.

Embodiments described herein, significantly decrease the amount of time needed to fabricate templates. It has been unexpectedly discovered that the data zones and servo zones on a template may be simultaneously created, instead of fabricating the data zones and servo zones separately. As a result, a number of steps are removed from the manufacturing process, thereby saving time. In addition, the removal of the steps no longer needed unexpectedly increases the quality of the templates by eliminating the possible errors inherent in the extra steps.

It is understood that specific references to BPM are not intended to be limiting in scope. For example, a template (e.g., microimprint template, nanoimprint template, etc.) may correspond to any recording medium or recording media to which lithographic (e.g. microlithographic, nanolithographic, etc.) patterning may be applied or extended. As such, the template may include, but is not limited to, a template for longitudinal magnetic recording media, a template for perpendicular magnetic recording media, a template for discrete track recording media, or a template for pit-patterned media.

Referring now to FIG. 1, a post imprinting servo and data region resist pattern 100 is shown according to one aspect of the present embodiments. A substrate 102 of a suitable material is provided. The substrate 102 may be a conducting, semiconducting, or non-conducting material such as silicon, quartz, carbon, chromium, tantalum, or any other suitable material. A resist layer 104 is deposited over the substrate 102. The resist layer 104 may include any suitable resist material, and some non-limiting examples include polymethyl methacrylate, polystyrene, and styrene acrylonitrile.

In various embodiments, the resist layer 104 may be patterned into an initial pattern using, for example, known ebeam and imprinting steps. Such an initial pattern includes servo features 106 and data features 108. In addition, residual resist 110 may remain between the servo features 106 and the data features 108. The servo features 106 together form a servo zone guiding pattern 112 with a critical dimension pitch of about 50-200 nm. The data features 108 together form a data zone guiding pattern 114 with a critical dimension pitch of about 15-50 nm. The servo features 106 and the data features 108 have a negligible resist height difference, e.g. less than 3 nm, however the data features 108 are smaller than the servo features 106.

Figure 2:
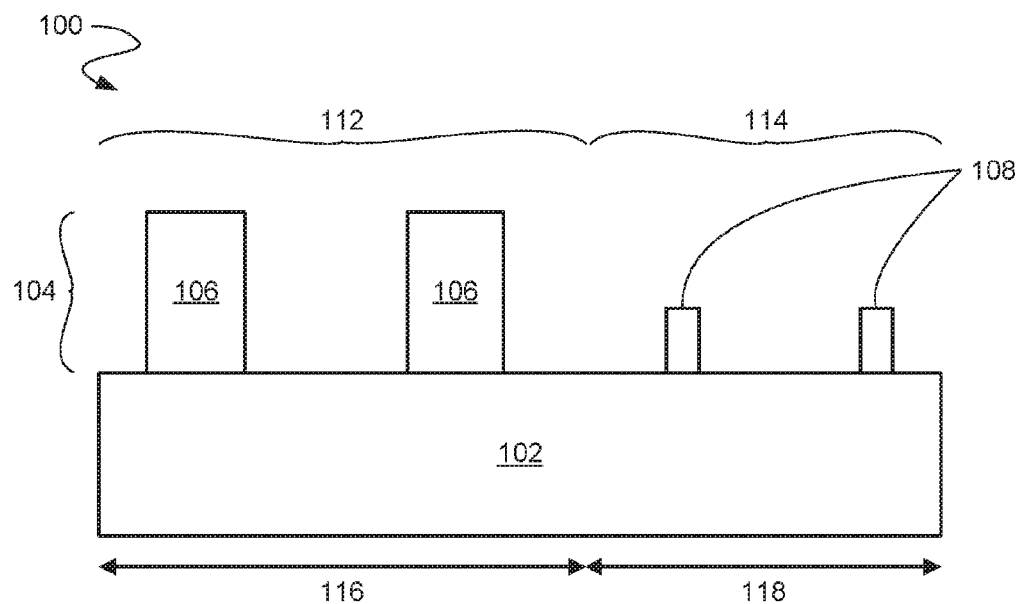
FIG. 2 shows the servo and data region resist pattern after trimming with an isotropic reactive ion etch according to one aspect of the present embodiments.

Referring now to FIG. 2, the servo and data region resist pattern 100 after trimming is shown according to one aspect of the present embodiments. In various embodiments, an isotropic oxygen reactive ion etch is applied to trim the resist layer 104. It is understood that other suitable trimming methods may be used, without deviating from the scope of the embodiments. As a result of the trimming, the residual resist 110 (see FIG. 1) is removed, thereby exposing areas of the substrate 102 between the servo features 106 and the data features 108.

In addition, as a further result of the trimming, the sizes of the servo features 106 and the data features 108 are reduced. The height of the data features 108 is reduced more than the height of the servo features 106, because the data features 108 were initially smaller. For example after the resist layer 104 trimming, the servo features 106 may be 10-30 nm in vertical height and 10-100 nm in lateral width. In addition after the resist layer 104 trimming, the data features 108 may be 1-5 nm in vertical height and 5-50 nm in lateral width. Therefore, a height difference, for example, of 5-29 nm may exist between the servo features 106 and the data features 108 after trimming.

It is therefore understood that the servo features 106 form the servo zone guiding pattern 112 in a servo zone 116. Furthermore, the data features 108 form the data zone guiding pattern 114 in a data zone 118. In addition after trimming, the servo features 106 are a first set of features that are larger and taller than the data features 108 which are a second set of features that are narrower and shorter.

Figure 3:
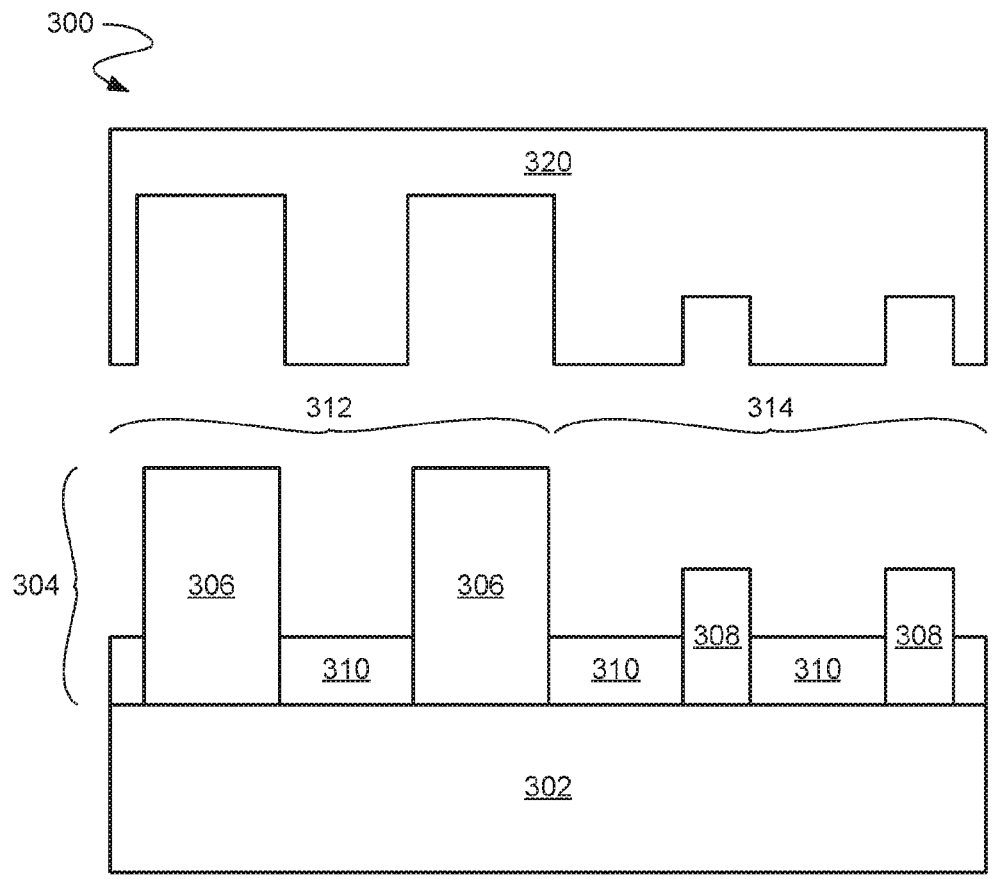
FIG. 3 shows an imprint mold and a post imprinting servo and data region resist pattern according to one aspect of the present embodiments.
Figure 4:
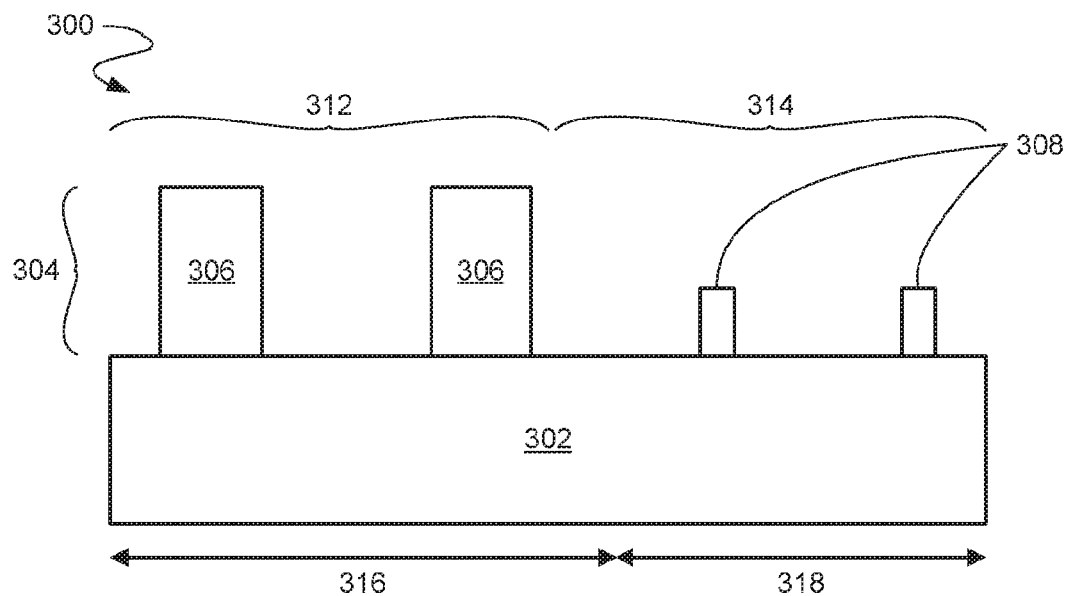
FIG. 4 shows the servo and data region resist pattern after resist thinning with an anisotropic reactive ion etch according to one aspect of the present embodiments.

FIGS. 1 and 2 illustrate embodiments using ebeam and imprinting steps. FIGS. 3 and 4 will illustrate use of a 3-D imprint mold without ebeam. Referring now to FIG. 3, an imprint mold and an imprinted servo and data region resist pattern 300 is shown according to one aspect of the present embodiments. A substrate 302 includes a resist layer 304 deposited thereon. The resist layer 304 has been imprinted with an imprinter 320. The imprinter 320 may be, for example, a 3-D imprint mold, however it is understood that various embodiments are not limited to such a mold.

In various embodiments, the imprinter 320 imprints resist layer 304 into an initial pattern including servo features 306 (e.g. a first set of features) and data features 308 (e.g. a second set of features). In addition, residual resist 310 may remain between the servo features 306 and the data features 308. The servo features 306 together form a servo zone guiding pattern 312 with a critical dimension pitch of about 50-200 nm. The data features 308 together form a data zone guiding pattern 314 with a critical dimension pitch of about 15-50 nm. The servo features 306 are taller than the data features 308, and the data features 308 are smaller than the servo features 306. For example, a height difference between the servo features 306 and the data features 308 may be 5-20 nm.

Referring now to FIG. 4, the servo and data region resist pattern 300 after resist thinning is shown according to one aspect of the present embodiments. In various embodiments, an anisotropic reactive ion etch is applied to trim the resist layer 304. It is understood that other suitable trimming methods may be used, without deviating from the scope of the embodiments. As a result of the trimming, the residual resist 310 (see FIG. 3) is removed, thereby exposing areas of the substrate 302 between the servo features 306 and the data features 308.

In addition, as a further result of the trimming, the sizes of the servo features 306 and the data features 308 are reduced. For example after the resist layer 304 trimming, the servo features 306 may be 10-30 nm in vertical height and 10-100 nm in lateral width. In addition after the resist layer 304 trimming, the data features 308 may be 1-5 nm in vertical height and 5-50 nm in lateral width. Therefore, a height difference, for example, of 5-29 nm may exist between the servo features 306 and the data features 308 after trimming.

It is therefore understood that the servo features 306 form the servo zone guiding pattern 312 in a servo zone 316. Furthermore, the data features 308 form the data zone guiding pattern 314 in a data zone 318. In addition after trimming, the servo features 306 are a first set of features that are larger and taller than the data features 308 which are a second set of features.

Figure 5:
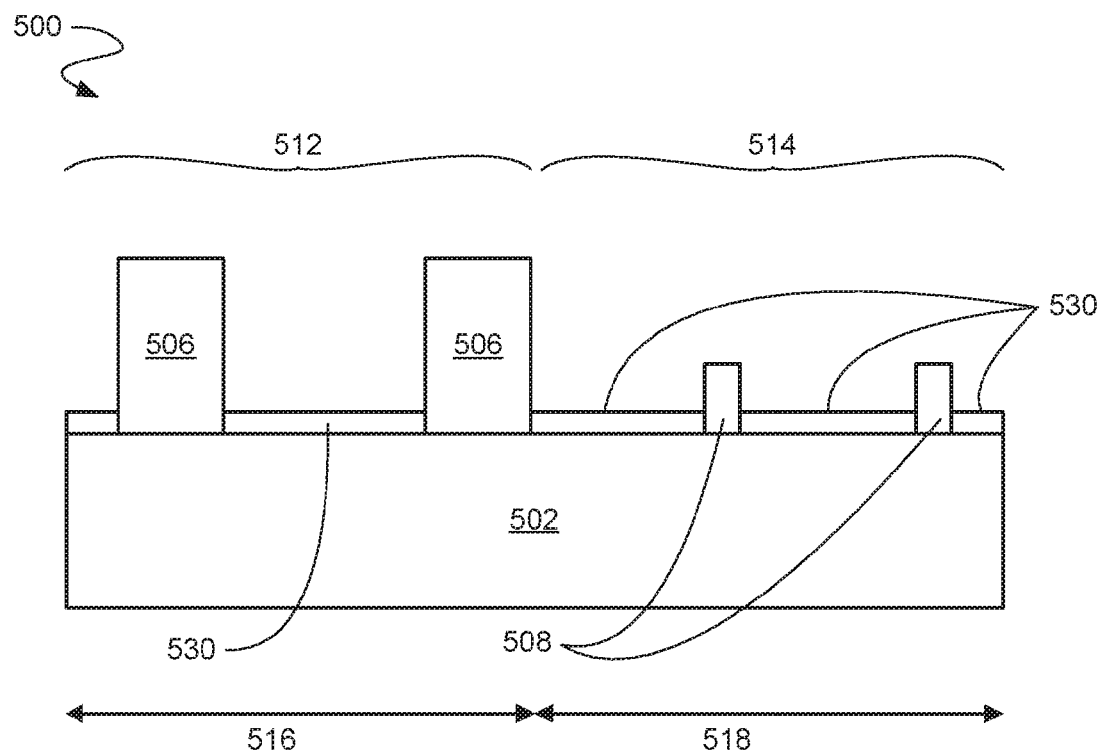
FIG. 5 shows a resist prepattern including a preferential polymer brush according to one aspect of the present embodiments.

Referring now to FIG. 5, a resist prepattern 500 including a preferential polymer brush 530 is shown according to one aspect of the present embodiments. In various embodiments, a prepattern of servo features 506 and data features 508 may be formed on a substrate 502 using the method described in FIGS. 1 and 2 or the method described in FIGS. 3 and 4. The servo features 506 form a servo zone guiding pattern 512 in a servo zone 516, and the data features 508 form a data zone guiding pattern 514 in a data zone 518. In various embodiments, a preferential polymer brush 530 is applied to the servo zone guiding pattern 512 and the data zone guiding pattern 514.

In various embodiments the servo features 506 are large enough to topographically guide a directed self-assembly ("DSA") within the servo zone guiding pattern 512. On the other hand, in some embodiments the data features 508 are too small to topographically guide the DSA in the data zone guiding pattern 514. Therefore, the DSA may be chemically guided within the data zone guiding pattern 514 as a result of the chemical differences between the resist (e.g. the data features 508), the substrate 502, and/or the preferential polymer brush 530.

Figure 6:
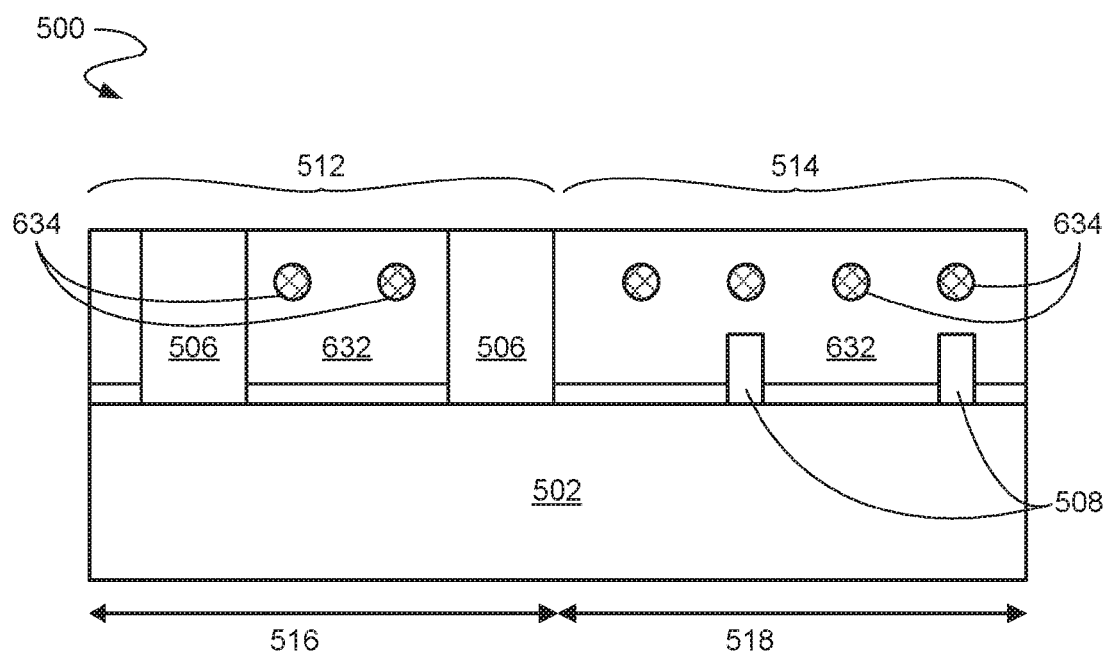
FIG. 6 shows directed self-assembly ("DSA") of a lying down servo and data region pattern according to one aspect of the present embodiments.

Referring now to FIG. 6, directed self-assembly of a lying down servo and data region pattern 600 is shown according to one aspect of the present embodiments. The DSA technique forms self-assembling structures using block copolymers within the servo zone guiding pattern 512 and the data zone guiding pattern 514. The block copolymers self-assemble into polymer block A 632 and polymer block B 634 within both the servo zone guiding pattern 512 and the data zone guiding pattern 514 at the same time. The DSA of the block copolymers forms cylindrical structures in a horizontal orientation with respect to the servo zone features 506 of the servo guiding pattern 512 and the data zone features 508 of the data zone guiding pattern 514.

Therefore, the DSA of the servo zone and the data zone occurs simultaneously in a unified process. As a result, DSA of the block copolymers concurrently forms a servo zone pattern about the servo features 506 (e.g. a first set of features) in the servo zone 516 and a data zone pattern about the data zone features 508 (e.g. a second set of features) in the data zone 518. As such, process steps are saved by reducing the number of steps that were formerly used in the sequential process of creating the servo zone and the data zone in separate steps.

Thus, the servo zone pattern is patterned about a first set of features on the underlying substrate 502, and the data zone pattern is patterned about a second set of features on the underlying substrate 502. In the present embodiment, the polymer block B 634 is a cylindrical lying down structure that is surrounded by polymer block A 632. It is understood that DSA is not limited to such structures. Indeed various data zone guiding patterns, servo zone guiding patterns, and block copolymers may create numerous shapes and structures as a result of DSA. In various embodiments, the polymer bock B 634 and the polymer block A 632 may be used in subsequent processing steps (not shown) to create the finished template. For example, the polymer block B 634 may be used as mask for etching a pattern into the substrate 502, thereby creating an quartz template for further processing steps (not shown).

In various embodiments, the block copolymers may include polystyrene-block-polymethylmethacrylate ("PS-b-PMMA"), polystyrene-block-poly2-vinylpyridine ("PS-b-P2VP"), polystyrene-block-poly4-vinylpyridine ("PS-b-P4VP"), polystyrene-block-polyethyleneoxide, polystyrene-block-polyisoprene, polystyrene-block-butadiene, polystyrene-block-polydimethyl-siloxane ("PS-b-PDMS"), or polystyrene-block-polyferrocenylsilane. The selection of block copolymers may depend upon a target DSA pattern, because certain block copolymers may correlate better with particular topographical pattern features or dimensions. For example, certain block copolymers may be used with certain patterns to form cylindrical, lamellar, and spherical structures. Furthermore, the block copolymers may include organic components, inorganic components, or a combination of organic and inorganic components. Although particular block copolymers selected for form particular DSA structures are described, it is understood that these descriptions are not limiting and various other suitable block copolymers may be used to form desired DSA structures.

Figure 7:
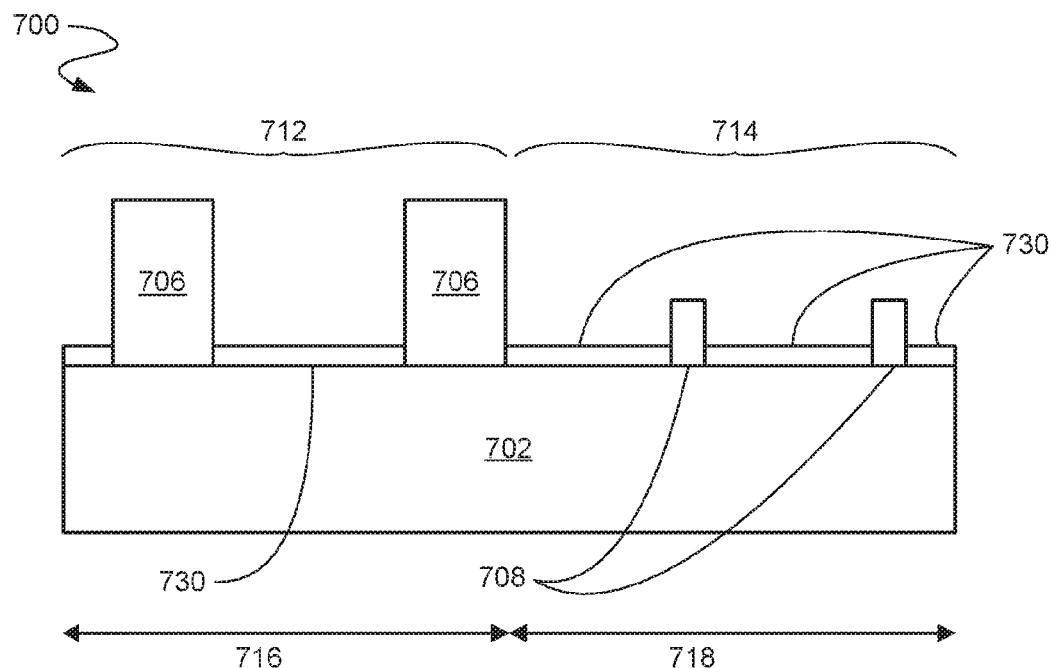
FIG. 7 shows a resist prepattern including a neutral polymer brush according to one aspect of the present embodiments.

Referring now to FIG. 7, a resist prepattern 700 including a neutral polymer brush 730 is shown according to one aspect of the present embodiments. In various embodiments, a prepattern of servo features 706 and data features 708 may be formed on a substrate 702 using the method described in FIGS. 1 and 2 or the method described in FIGS. 3 and 4. The servo features 706 form a servo zone guiding pattern 712 in a servo zone 716, and the data features 708 form a data zone guiding pattern 714 in a data zone 718. The servo features 706, the data features 708, and the neutral polymer brush 730 guide a directed self-assembly of patterns (described below).

Figure 8:
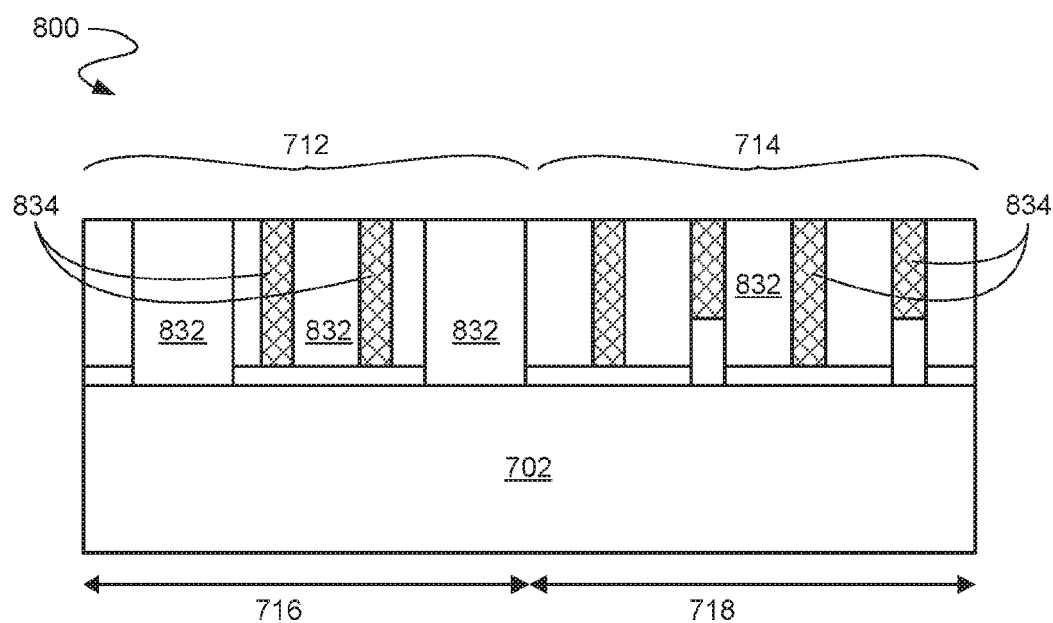
FIG. 8 shows DSA of a stand-up servo and data region pattern according to one aspect of the present embodiments.

Referring now to FIG. 8, DSA of a stand-up servo and data region pattern 800 is shown according to one aspect of the present embodiments. The DSA technique forms self-assembling structures using block copolymers within the servo zone guiding pattern 712 and the data zone guiding pattern 714. The block copolymers self-assemble into polymer block A 832 and polymer block B 834 within both the servo zone guiding pattern 712 and the data zone guiding pattern 714 at the same time. The DSA of the block copolymers forms cylindrical structures in a vertical orientation with respect to the servo zone features 706 of the servo guiding pattern 712 and the data zone features 708 of the data zone guiding pattern 714.

Therefore, the DSA of the servo zone and the data zone occurs simultaneously in a unified process. In addition, the block copolymers simultaneously form a servo zone pattern in the servo zone 716 and a data zone pattern in the data zone 718. As such, process steps are saved by reducing the number of steps that were formerly used in the sequential process of creating the servo zone and the data zone in separate steps.

Thus, the servo zone pattern is patterned about a first set of features on the underlying substrate 702, and the data zone pattern is patterned about a second set of features on the underlying substrate 702. In the present embodiment, the polymer block B 834 is a cylindrical stand-up structure that is surrounded by polymer block A 832. It is understood that DSA is not limited to such structures. Indeed various data zone guiding patterns, servo zone guiding patterns, and block copolymers may create numerous shapes and structures as a result of DSA. In various embodiments, the polymer bock B 834 and the polymer block A 832 may be used in subsequent processing steps (not shown) to create the finished template. For example, the polymer block B 834 may be used as mask for etching a pattern into the substrate 702, thereby creating an quartz template for further processing steps (not shown).

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A method comprising:
   forming a data zone guiding pattern in a data zone;
   forming a servo zone guiding pattern in a servo zone, wherein servo features within the servo zone guiding pattern are larger than data features within the data zone guiding pattern;

simultaneously reducing sizes of the servo features and the data features, wherein after the reducing the data features are shorter than the servo features;
applying a brush to the data zone guiding pattern and the servo zone guiding pattern; and
simultaneously forming a servo zone pattern within the servo zone and a data zone pattern within the data zone by directed self-assembly of block copolymers.

2. The method of claim 1, wherein applying the brush includes applying a preferential polymer brush.

3. The method of claim 1, wherein applying the brush includes applying a neutral polymer brush.

4. The method of claim 1, wherein the reducing includes an isotropic reactive ion etch.

5. The method of claim 1, wherein the reducing includes an anisotropic reactive ion etch.

6. The method of claim 1, wherein
the servo features are 50-200 nm in height before the reducing, and
the servo features are 10-30 nm in height after the reducing.

7. The method of claim 1, wherein
the data features are 15-50 nm in height before the reducing, and
the data features are 1-5 nm in height after the reducing.

8. The method of claim 1, wherein a difference in height between the data features and the servo features before the reducing is less than 3.0 nm.

9. A method comprising:
forming a data zone guiding pattern;
forming a servo zone guiding pattern;
reducing the height and width of the data zone guiding pattern and the servo zone guiding pattern; and
simultaneously forming a servo pattern and a data pattern, wherein directed self-assembly of block copolymers is guided by the data zone guiding pattern and the servo zone guiding pattern.

10. The method of claim 9, further comprising applying a preferential polymer brush to the data zone guiding pattern and the servo zone guiding pattern.

11. The method of claim 9, further comprising applying a neutral polymer brush to the data zone guiding pattern and the servo zone guiding pattern.

12. The method of claim 9, wherein servo features within the servo zone guiding pattern are 10-100 nm in lateral size.

13. The method of claim 9, wherein data features within the data zone guiding pattern are 5-50 nm in lateral size.

14. The method of claim 9 wherein a difference in height between data features in the data zone guiding pattern and servo features in the servo zone guiding pattern is less than 30 nm.

15. A method comprising:
patterning a servo pattern about a first set of features by a directed self-assembly of block copolymers; and
patterning a data pattern about a second set of features by the directed self-assembly of block copolymers, wherein
the first set of features and the second set of features are features formed in a resist layer;
the first set of features are larger than the second set of features,
the first set of features are taller than the second set of features, and
the patterning the servo pattern and the patterning the data pattern are concurrent.

16. The method of claim 15, further comprising patterning the first set of features and the second set of features with an imprint mold.

17. The method of claim 15, wherein the directed self-assembly of block copolymers forms cylindrical structures in a horizontal orientation with respect to the first set of features and the second set of features.

18. The method of claim 15, wherein the directed self-assembly of block copolymers forms cylindrical structures in a vertical orientation with respect to the first set of features and the second set of features.

19. The method of claim 15, wherein the patterning the servo pattern includes patterning the servo pattern about a first set of features on an underlying substrate.

20. The method of claim 15, wherein the block copolymers are PS-b-PDMS, PS-b-PMMA, PS-b-P2VP, or PS-b-P4VP.

* * * * *

UNITED STATES PATENT AND TRADEMARK OFFICE
CERTIFICATE OF CORRECTION

PATENT NO. : 9,865,294 B2  
APPLICATION NO. : 15/233277  
DATED : January 9, 2018  
INVENTOR(S) : Xiao et al.

Page 1 of 1

It is certified that error appears in the above-identified patent and that said Letters Patent is hereby corrected as shown below:

On the Title Page

Item (72), in the listing of Inventors:
After XiaoMin Yang, delete "Liv, CA (US)" and insert -- Livermore, CA (US) --, therefor.

Signed and Sealed this  
Third Day of July, 2018

Andrei Iancu  
*Director of the United States Patent and Trademark Office*